May 7, 1968  A. B. HAZARD  3,381,303
SPACE SUIT

Filed Jan. 2, 1964  6 Sheets-Sheet 1

INVENTOR.
ALLYN B. HAZARD
BY *William E. Hiller*
*Edward O. Ansell*
ATTORNEYS

May 7, 1968  A. B. HAZARD  3,381,303
SPACE SUIT

Filed Jan. 2, 1964  6 Sheets-Sheet 3

INVENTOR.
ALLYN B. HAZARD
BY William E. Hiller
Edward O. Ansell
ATTORNEYS

May 7, 1968  A. B. HAZARD  3,381,303
SPACE SUIT

Filed Jan. 2, 1964  6 Sheets-Sheet 4

*INVENTOR.*
ALLYN B. HAZARD

BY *William E. Hiller*
*Edward O. Ansell*
ATTORNEYS

May 7, 1968     A. B. HAZARD     3,381,303
SPACE SUIT
Filed Jan. 2, 1964     6 Sheets-Sheet 5
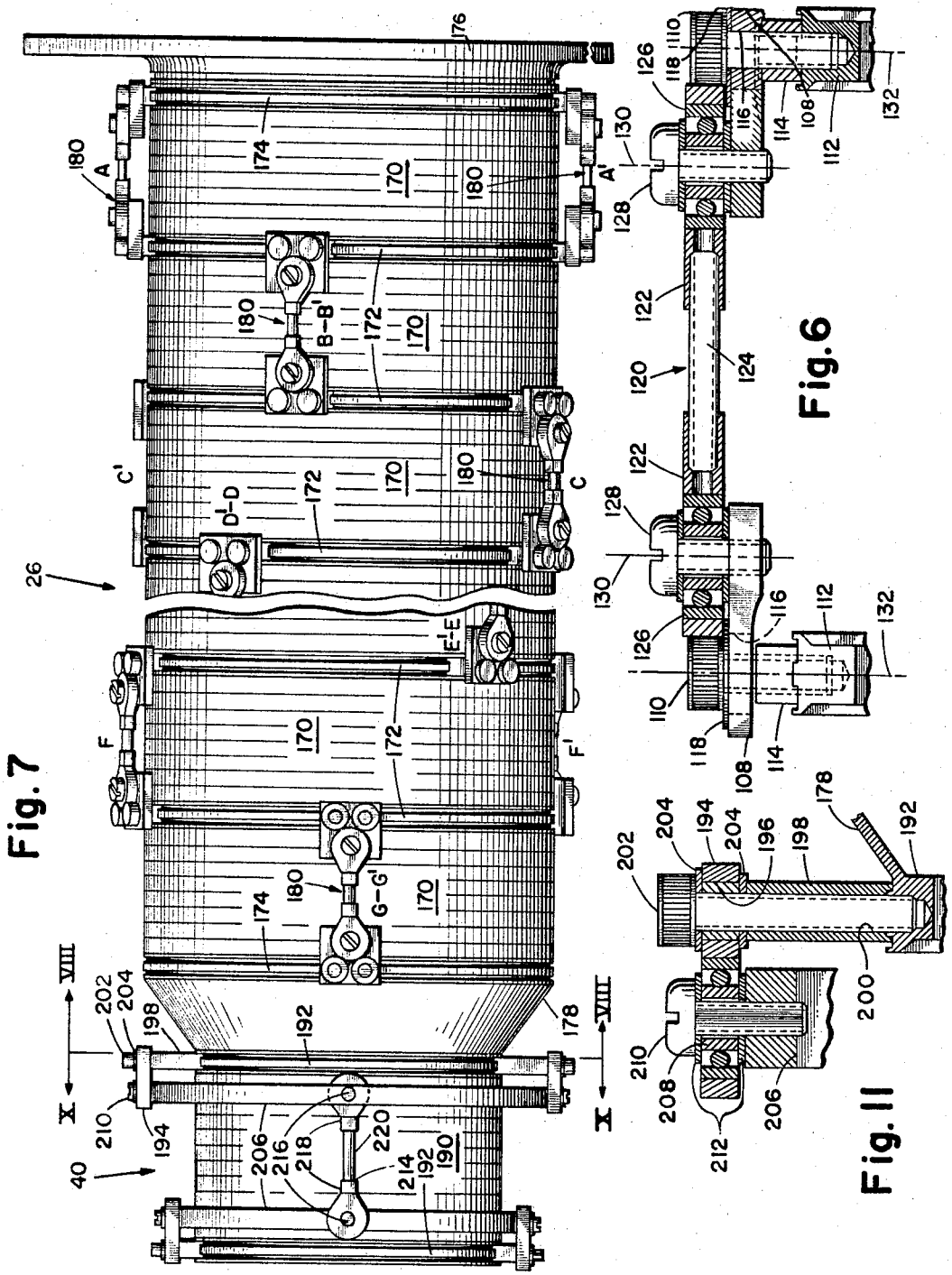

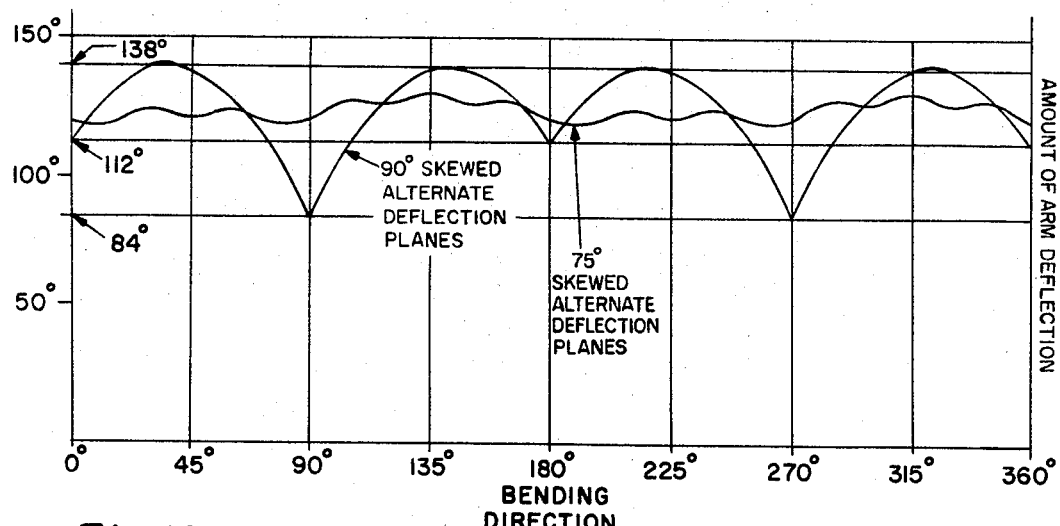
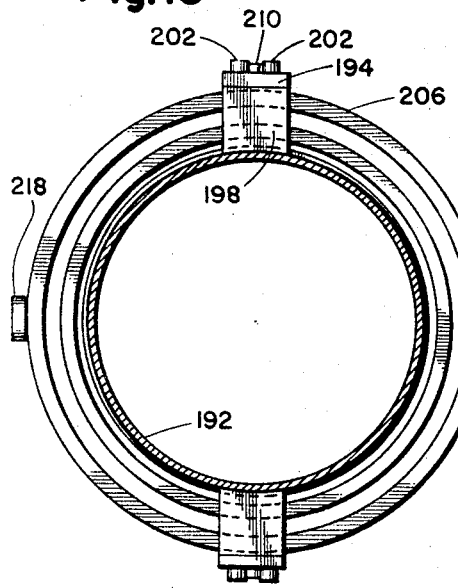
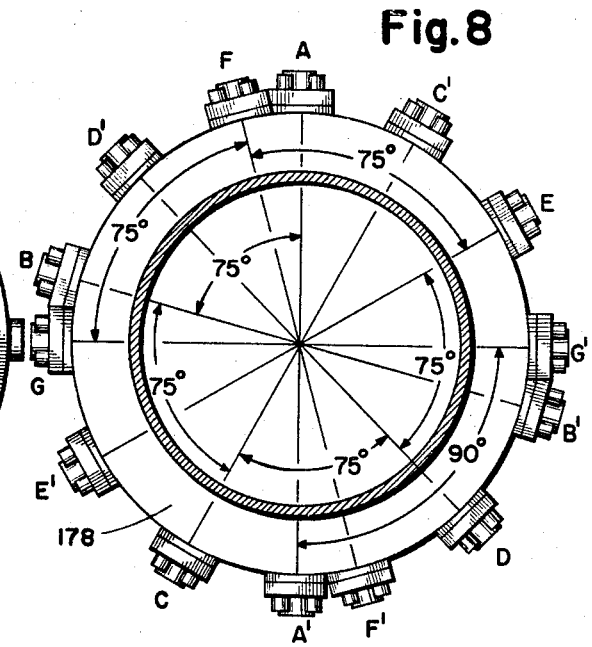

United States Patent Office 3,381,303
Patented May 7, 1968

3,381,303
SPACE SUIT
Allyn B. Hazard, Altadena, Calif., assignor, by mesne assignments, to Aerojet-General Corporation, El Monte, Calif., a corporation of Ohio
Filed Jan. 2, 1964, Ser. No. 335,115
22 Claims. (Cl. 2—2.1)

My invention relates to an improved space suit and more particularly to bellows joints therefor.

As man looks toward other worlds, he leaves the friendly environment of his earth to enter hostile surroundings. This search has been slow but has progressed with continued understanding of the surroundings to be encountered. At first, high altitude balloon and airplane flights were made only with oxygen supply. These flights proved that one could perform at high altitudes but in an extremely limited fashion because of the sparseness of air. It was recognized that further flights at higher altitudes would require pressurization either of cabin or of suit.

To satisfy such requirements, various investigations were made into the use of pressurized suits. One version of rubber, pressurized at 3 p.s.i., proved impractical because of ballooning and was subsequently replaced by another having an inner layer to retain the pressure and an outer fabric to maintain a particular shape. Other versions included full pressure suits of fabric and all metal suits utilizing ball joints in the knees, hips, elbows, and shoulders.

These designs are found to include several deficiencies. Ball joints are not sufficiently reliable in the locale of near vacuum because of the impossibility of being leakproof. Full pressure fabric suits also leak to a degree which makes them not feasible. If the fabric were coated, such suits could not survive in space and would require special supplemental protective overlayers for protection from micrometeorites, for example.

Suits similar to those employed in recent space programs do not lend themselves to space exploration except within the protective confinement of a space capsule or vehicle. Because the vehicle is constructed to safeguard the occupant from extreme vacuum, great differences in temperature, radiation, meteorites, etc., these suits need only add certain refinements to the protective devices already provided by the space capsule or vehicle. Furthermore, such suits do not require provision for great mobility and against leakage because of the capsule's cramped quarters and the small pressure differential between the interior of the capsule and the interior of the suit.

It is, therefore, an object of my invention to provide for a space suit allowing for substantially unrestricted mobility, whether pressurized or not.

Another object of my invention is to provide an improved space suit in which novel joint constructions are incorporated.

A further object of my invention is to provide in a space suit, novel joint constructions characterized by having a neutrally stable bellows as a component thereof to achieve easy flexibility for the arms, wrists, hips, thighs, knees, and ankles of the space suit.

Other aims and objects of my invention will become apparent from the following explanation and detailed description thereof.

Conventional suits of fabric or metal having ball joints have not been entirely satisfactory for space exploration as explained above. The present invention concerns an all metal suit having welded metal bellows joints and a protective outer coating. Each bellows joint includes a bellows and a restraint linkage designed in such a manner that a link provided with pivots is secured to the ends of each bellows, the distance between the pivots being greater than 65% of the distance between the ends of the bellows depending primarily upon the spring constant of the bellows material. This construction allows the bellows to be flexed without changing the volume of gas contained within the bellows joint and comprises what may be termed a "neutrally stable bellows."

The body section of the space suit is provided with a large diameter to allow the occupant of the space suit sufficient room to lean back and withdraw his hands inside in order to operate controls or perform necessary daily functions. This section is made flexible by the provision of a hip bellows joint to permit such movements as bending and climbing. The hip bellows joint is arranged with a universal linkage also having the greater than 65% mid-link arrangement.

Each arm comprises a series of bellows, each bellows having a mid-link arrangement of greater than 65% and being restrained with the planes of deflection of adjacent bellows rotated 75° from each other. This rotation permits a deflection greater than and with less effort than if the rotation was 90°. A wrist bellows joint which is slightly smaller in diameter than the series of bellows is joined thereto and is arranged with a universal linkage. Preferably, a rotary joint is connected to the wrist bellows joint. The rotary joint comprises a series of alternating rings and discs so interleaved as to provide an effective and efficient seal. A thrust bearing may also be included in the rotary joints should there be an insufficient number of rings and discs.

Each leg comprises an ankle bellows joint, a knee bellows joint, and a double thigh bellows joint connected together by tubular portions. The double joint comprises a pair of rings having the novel bellows mid-link arrangement and a pair of links between the rings disposed 90° from the mid-links. The knee and ankle bellows joints are similar to the single joints described above. A rotary joint may be arranged adjacent the ankle bellows joint if mobility requirements demand its use.

The head, hand, and foot sections may comprise conventional or novel features depending on their adaptability to space phenomena. Since the features of the latter sections of the space suit are not important to an understanding of the present invention, these features will not be described in detail.

For a more complete understanding of my invention, reference is made to the following explanation and the accompanying drawings in which:

FIG. 6 is an enlarged longitudinal sectional view, partially in elevation, of one of the links of any of the bellows joints;

FIG. 7 is an enlarged elevational view of the arm bellows joint and the wrist bellows joint;

FIG. 8 is a transverse sectional view taken along line VIII—VIII of FIG. 7;

FIG. 9 is a graphical illustration comparing the arm joint arrangement with a conventional arrangement;

FIG. 10 is a transverse sectional view taken along line X—X of FIG. 7;

FIG. 11 is an enlarged fragmentary sectional view of a portion of the wrist joint.

Figure 1:
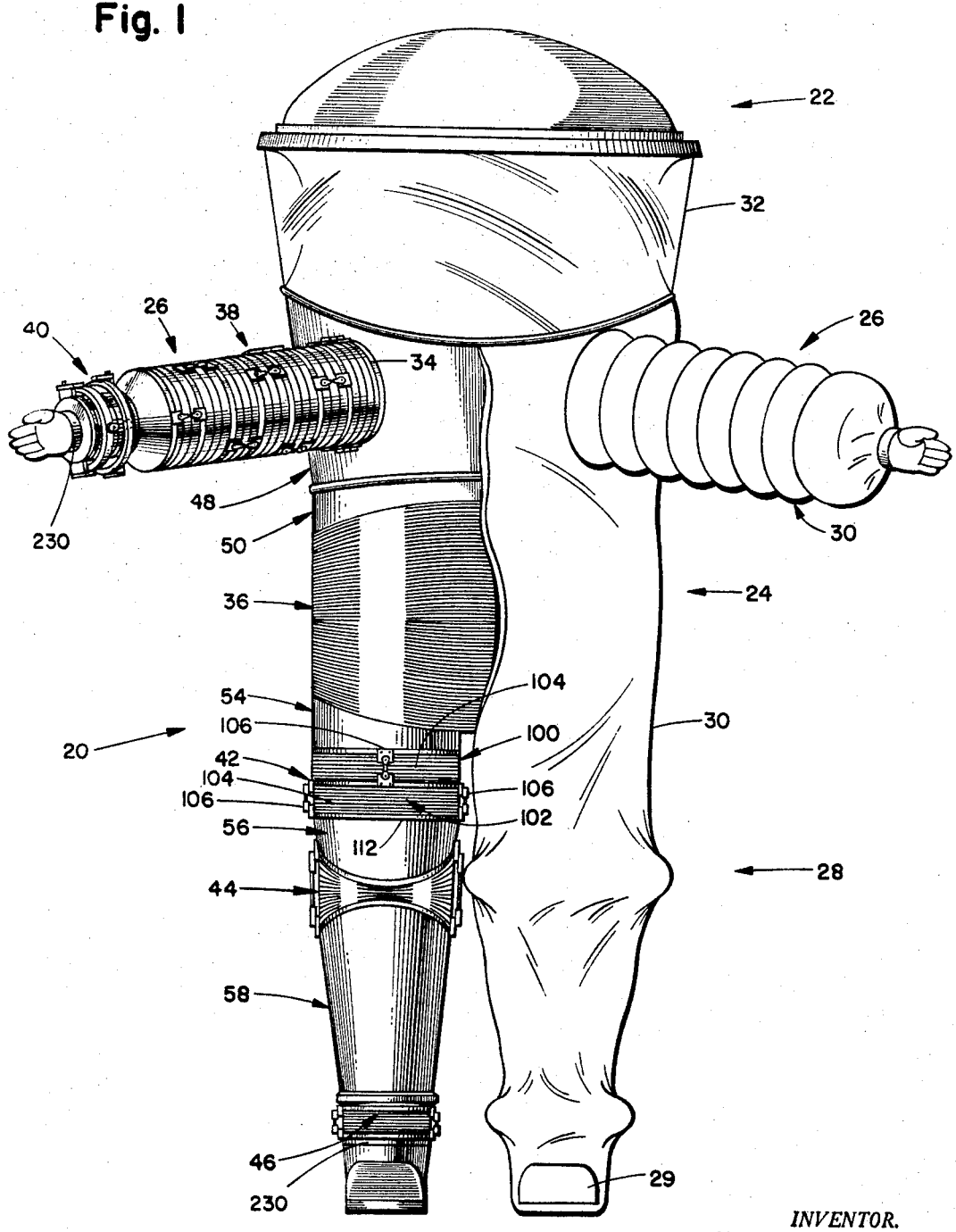
FIG. 1 is a front elevational view of a space suit with part of the protective outer layer removed to expose the various bellows joints.
Figure 2:
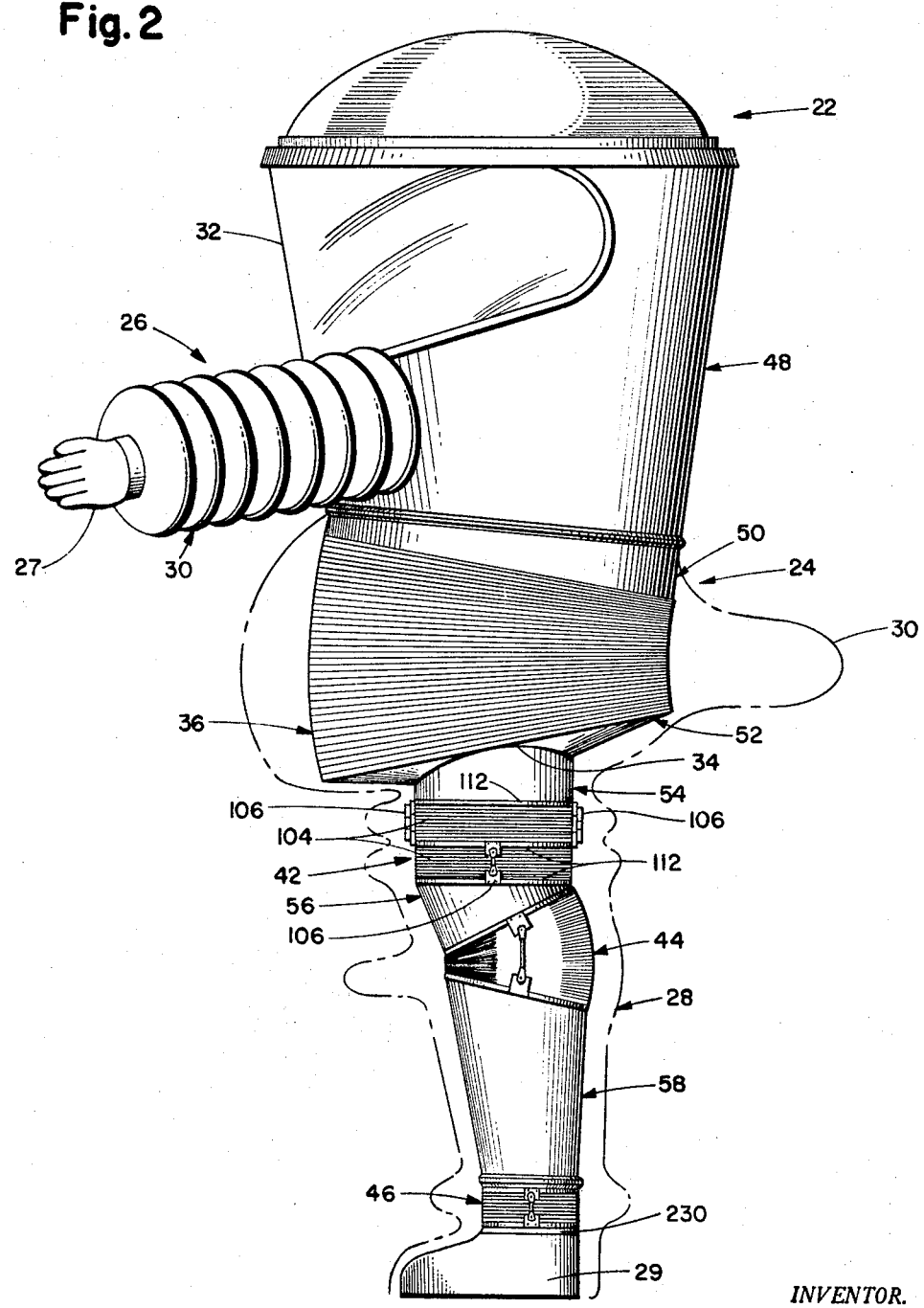
FIG. 2 is a side elevational view of the space suit shown in FIG. 1.

Referring to FIGS. 1 and 2, there is illustrated an improved space suit 20 in accordance with the present invention, the space suit 20 generally comprising head section 22, body section 24, a pair of arm sections 26, a pair of leg sections 28, a pair of feet 29, and a protective outer coat 30. All sections and components thereof are preferably formed of stainless steel and are secured together by welding except where noted. For example, the protective outer coat 30 is formed of several materials of particular composition which will insure maximum insulation from radiation, micrometeors and other hazards of space. Although the head section 22 is shown integral with the body section 24 for purposes of illustration, it will be understood that the head section 22 and the body section 24 may be formed as separate parts which are secured together by welding or other suitable fastening means.

Head section 22 is provided with a window 32 which is preferably laminated of special transparent materials and assembled in such a manner as to prevent fogging, to minimize heat transfer, to reduce glare, to provide strength against bombardment by spatial objects, and to provide general protection against various space hazards.

Flexibility and consequent mobility of the space suit 20 is assured by the provision of a plurality of bellows joints at various locations on the space suit 20, the bellows joints including hip joint 36, arm joints 38, wrist joints 40, thigh joints 42, knee joints 44, and ankle joints 46. All of these joints are preferably metallic and are secured to respective tubular metal portions 48, 50, 54, 56, and 58, and pan 52 of the space suit 20 by welding as noted above. Outer coat 30 is bulged around the several joints to permit flexure.

With the improved space suit 20 being worn, it is possible for the wearer to perform substantially all body motions including bending and climbing ladders and steep grades. The attainment of flexibility and mobility in the space suit 20 is further achieved by a novel restraint linkage to provide a bellows that is neutrally stable in bending.

To promote an adequate understanding of the novel bellows joints in the space suit 20 herein disclosed, consideration of the background surrounding the development of the restraint linkage will be helpful. In this latter connection, consider first a pressurized container such as a cylindrically shaped balloon. When such a balloon is pressurized, it will assume a shape such that the pneumatic forces are exactly balancing the forces in the rubber membrane. Should the rubber balloon originally have been molded in a cylindrical shape, when it is pressurized it will tend to assume the familiar frankfurter shape. If an effort is made to bend such a balloon, a resistance will be encountered and, when the applied bending moment is released, the balloon will straighten out and regain its former shape. The resistance encountered as the balloon is bent is the result of two factors. First, the rubber material of the balloon resists the deflection of the balloon caused by bending and, second, there is the resistance which results from a change, or diminution, in volume as the balloon is deflected. The greater portion of the applied work is consumed in bending the balloon to compress the gas contained therein. A similar situation exists when the torso, arm, and leg members of a conventional full-pressure suit of the so-termed space type are bent. When one of these suits is pressurized, the limb members will assume a shape dependent upon the manner in which the fabric has been cut and sewn together. This natural shape will be such that the fabric forces are exactly balancing out the pneumatic forces. It is only through an effort by an occupant of the pressurized suit that these members can be deflected from their naturally stable positions. In accordance with my invention, each of the bellows joints in the space suit 20 is so constructed and arranged to prevent the bellows member corresponding thereto from assuming a particular position in preference to any other position when under internal pressure. Flexibility is provided in the space suit 20 by constructing and proportioning the components of the space suit 20 so that when a bellows member of the space suit 20 is bent, the pneumatic forces will exactly balance out the spring forces of the bellows member which are created by the tendency of the bellows member to retain its basic manufactured shape.

Figure 3:
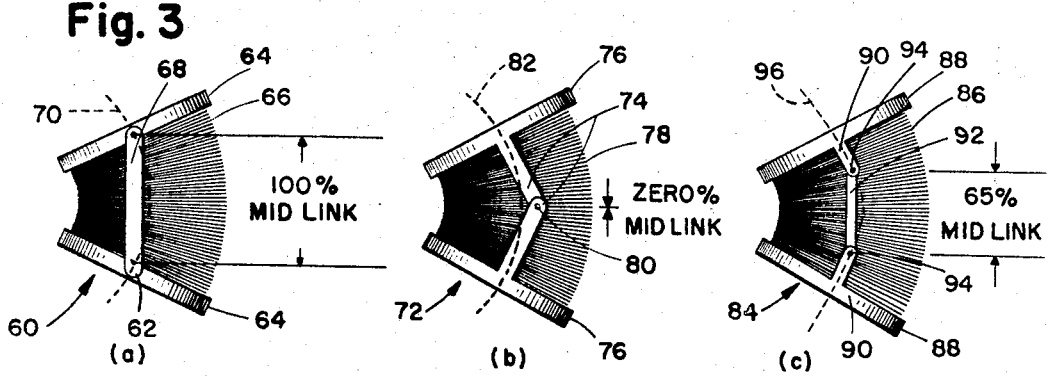
FIG. 3 is a comparative view of various linkages including the preferred embodiment.

In FIG. 3(a), a restraint linkage 60 is shown wherein pivot pins 62 have been placed directly in alignment with the opposite ends 64 of bellows 66. Here, the length of the link 68 between the pivot pins 62 may be said to be 100% of the total bellows length. Hereafter, a bellows such as this will be referred to as a 100% mid-link bellows. The curved axis 70 of the bellows is shown for the bellows in the deflected position. It will be appreciated that the length of this axis in the curved position will be longer than the straight line length of the axis when the bellows is not deflected. The gas volume contained within a bellows is equal to the mean cross-sectional area of the bellows multiplied by the axial length of the bellows. Since a straight line is the shortest distance between two points, the length of the curved axis must be longer and, accordingly, the gas volume contained within the bellows when the bellows is deflected will be greater than the gas volume within the bellows in its undeflected position. Therefore, work will be done by the pneumatic forces in bending the bellows. If the metallic bellows itself is not too stiff, the pneumatic forces can perform the work necessary to completely overcome the spring forces of the bellows, and the bellows will deflect until the pneumatic forces are exactly balanced by the increasing stiffness of the bellows. A bellows restraint system with a 100% mid-link, consequently, is unstable in the straight position, and such a bellows will seek some deflected position of equilibrium.

FIG. 3(b) depicts a bellows with a 0% mid-link restraint linkage 72 which, when compared with the linkage of FIG. 3(a), shows the linkage at the other extreme. Here, linkage 72 comprises links 74 rigidly affixed to the opposite ends 76 of bellows 78. Links 74 are pivoted by pin 80. When bellows 78 is bent, its ends 76 are moved closer to each other, and consequently as can be seen, its curved axis 82 becomes shorter than when the bellows 78 is straightened out. The gas volume contained within bellows 78 is accordingly decreased because the axial length of the bellows 78 is decreased and, therefore, compression work was done on the gas contained within the bellows 78. The 0% mid-link restraint linkage 72 therefore results in a bellows configuration which tends to remain straightened.

Two bellows restraint systems have been discussed— the 100% mid-link in which the bellows is stable in the deflected position and the 0% mid-link in which the bellows is stable in the undeflected or straight position. If mid-link arrangements intermediate these two extremes were selected, the natural stability of the bellows associated therewith would be affected accordingly. In fact, there is a point intermediate the 0% and 100% mid-links where there would be no tendency for the bellows either to deflect or to straighten out. It has been determined that a 65% mid-link is neutrally stable for a bellows having no inherent stiffness (i.e., a spring constant of zero), since there is no significant change in the axial length of the bellows and consequently no change in gas volume. Therefore, a mid-link bellows in which the links have lengths greater than 65% of the length of the bellows depending upon the spring constant of the bellows has many naturally stable positions.

As shown in FIG. 3(c), a mid-link restraint linkage 84 comprises a bellows 86 having ends 88. Links 90 are rigidly secured to the ends and are joined to an intermediate link 92 by pivot pins 94. In the 65% mid-link restraint linkage 84, curved axis 96 neither shortens nor lengthens upon deflection of bellows 86.

As a practical matter, however, this ideal situation with no net volume change within the bellows does not take into consideration the spring resistance of the metal bellows material. It is necessary, therefore, to lengthen link 92 to provide a restraint system which tends toward the 100% mid-link configuration in order to have some net pneumatic work of expansion as the bellows 86 deflects to overcome the resistance to deflection of the bellows spring forces. The amount of required biasing imposed on the bellows 86 in the lengthening of link 92 is related to the internal pressure level of the space suit 20 and the pressure differential between the interior and exterior of the space suit 20—generally, the greater the nominal operating pressure will be, the smaller the amount of required biasing imposed on the bellows 86 in lengthening link 92 will be.

Figure 4:
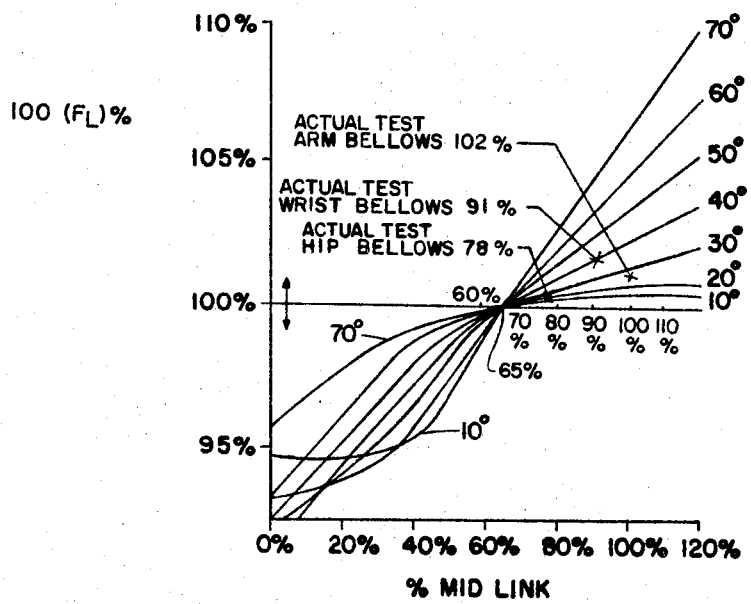
FIG. 4 is a graphical illustration of the percentage change of volume versus percent mid-link of the bellows shown in FIG. 3.

The graph in FIG. 4 demonstrates the percent of bellows volume change versus the percent mid-link for various deflection angles up through 70 degrees. From this graph, it will be observed that the 65% mid-link there is no apparent volume change for any angle of deflection. Thus, the 65% mid-link would be an ideal mid-length if the bellows were, in effect, made of tissue paper, i.e., without spring resistance. The effect of this spring resistance of the bellows is indicated on the graph as several design points ($x$) for the hip, wrist, and arm bellows. The design points for the hip, wrist, and arm bellows are taken from actual tests.

In accordance with the present invention, the greater than 65% mid-link bellows restraint linkage is used as the basis for all of the bellows joints in the space suit 20. Some joints like knee joint 44 and ankle joint 46 use a single restraint linkage with bending capability provided in only one plane, while other joints like hip joint 36, arm joint 38, wrist joint 40 and thigh joint 42 employ modification and combinations of the basic construction shown in FIG. 3(c) to permit bending in more than one plane. Since the improved space suit 20 is provided with a plurality of neutrally stable bellows members disposed in the various joints thereof, discussion of the various joints will be made with reference to 65% minimum mid-link restraint linkage for the respective bellows members as modified to account for the spring resistance thereof.

In order that a neutrally stable bellows is achieved, the work required to deflect a bellows considering the bellows to be mechanically the equivalent of a spring can be obtained from the pneumatic work of expansion of the enclosed atmosphere, and no additional work W is required when $$W_{spring} = W_{pneumatic}$$

The approximate bending moment $M_s$ for a bellows or helical spring when angularly deflected is calculated as $$M_s = \frac{KR^2\phi}{90}$$

where K is the spring constant of the material, R is the mean bellows radius, and $\phi$ is the angle of deflection in degrees.

The work performed in deflecting the bellows is $$W_{spring} = \frac{M_s\phi}{2(57.3)} = \frac{KR^2\phi^2}{180(57.3)} = \frac{KR^2\phi^2}{10,300} \text{ approx.}$$

The pneumatic work of expansion $W_p$ can be shown to equal approximately $$W_p = \Delta P(V_2 - V_1) = \Delta P \cdot V_1(F_L - 1)$$

when $\Delta P$ is the difference between inside and outside pressure, $V_2$ equals the volume of the bellows when deflected thru $\phi$ degrees, and $V_1$ equals the volume contained within the undeflected bellows and $F_L = V_2/V_1$.

Equating $W_s$ and $W_p$ for a neutrally stable bellows we have $$\frac{KR^2\phi^2}{10,300} = \Delta P \cdot V_1(F_L - 1)$$

and $$F_L = \frac{KR^2\phi^2}{10,300 \Delta P \cdot V_1} + 1$$

The spring constant K, radius R, deflection angle $\phi$, pressure differential $\Delta P$ and initial volume $V_1$ are all known. Determining $F_L$ in the above equation, enter the graph of FIG. 4 with $100(F_L)$ percent along with the ordinate axis and find the intersection of the ordinate value with the deflection angle $\phi$ ranging from 10–70°. The percentage mid-link length may be read from the abscissa scale. In all cases where the bellows material has any significant spring constant the mid-link length will exceed the minimum of 65%.

After design of a bellows linkage assembly, fabrication in accordance with the mid-link length proportioned according to the value just determined, actual testing of the bellows may show that the bellows has a tendency to either remain in the straight position or to be deflected one way or the other. In the case where the bellows tends to remain straight, the percentage mid-link length is readjusted to be longer until the bellows acts neutrally stable. If the bellows tends to deflect one way or the other, then the percentage mid-link length must be readjusted to a shorter length until it becomes neutrally stable. If the bellows tends to deflect only in one direction then the attachment points of the links must be repositioned so that they are exactly diametrically opposed. These adjustments are of a minor nature, i.e. ±5%, and may normally be made by preliminary turnbuckle adjustment.

The thigh joint

Each thigh joint 42 as seen in FIGS. 1 and 2 comprises neutrally stable bellows joints 100 and 102 having a relative displacement of 90° to provide for a universal thigh joint. Each bellows joint comprises a bellows 104 and a pair of linkages 106, such as the linkage illustrated in FIG. 6. At each of the ends thereof, each linkage includes an adjustment plate 108 bolted by a cap screw 110 to a coupling 112. The couplings 112 respectively couple the two bellows 104 of the thigh joint 42 together and attach the two bellows 104 to the tubular metal portions 54 and 56 of the space suit 20, as by welding.

A mount 114 is disposed about the cap screw 110 between the adjustment plate 108 and the coupling 112. Adjustment plate 108 is provided with an enlarged opening 116 through which the cap screw 110 extends. This opening 116 is adapted for adjustment of the linkage between the couplings 112. A washer 118 is positioned between the head of the cap screw 110 and the adjustment plate 108 to prevent the head from entering the opening 116 and to complete the fastening of the adjustment plate 108 to the coupling 112. Intermediate the two adjustment plates 108, there is a connecting link 120. The link 120 comprises a pair of retainers 122 joined by a spacer screw 124 and is connected to the proximal ends of adjustment plates 108 by a bearing 126 and a screw 128 in each instance. The distance between the axes 130 of screws 128 is greater than 65% of the distance between the axes 132 of screws 110 so as to contribute to a neutrally stable condition for the bellows associated therewith. The axes 132 are generally arranged to pass through the center of the coupling 112 corresponding thereto. It will be understood that the linkage shown in FIGURE 6 may be simplified by appropriate modification thereof to eliminate its adjustable feature which is helpful mainly for initial experimentation or for permitting sizing of the space suit 20 for individuals of differing heights or proportions.

The hip joint

Figure 5:
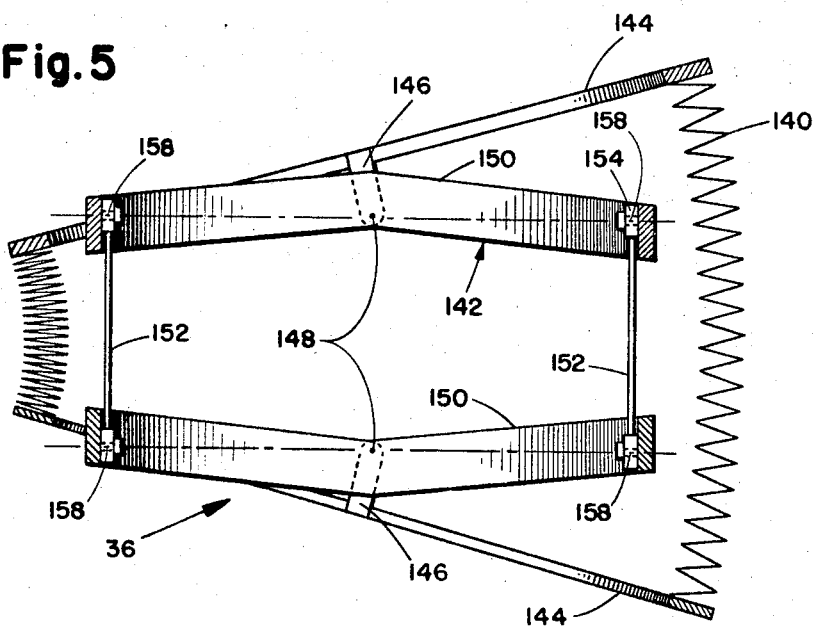
FIG. 5 is a vertical sectional view of the hip bellows joint.

Referring now to FIG. 5, hip joint 36 comprises a bellows 140 and a linkage 142 secured thereto. A coupling 144 is welded to each end of the bellows 140 and two pairs of journals 146 are fastened to the couplings 144. The journals 146 are provided with pivots 148 on which ring links 150 are pivoted. The distance between pivots 148 is greater than 65% of the distance between couplings 144 to provide a neutrally stable bellows 140. A pair of linkages 152 which have the greater than 65% length are pivotally secured between ring links 150 at points or bearing connections 158 which are 90° offset from journals 146. Each linkage 152 may be fabricated as a turnbuckle assembly similar to the link 120 of FIG. 6, so as to be adjustable between the ring links 150 to which the linkage 152 is pivotally secured. The points or bearing connections 158 lie in the same plane with pivots 148; thus, the distance between the bearing connections 158 at the opposite ends of each linkage 152 is in excess of 65% of that between the coupling 144. Accordingly, this construction of two mid-links having a 90° angular offset provides a universal linkage assembly. This universal linkage assembly in combination with bellows 140 provides a neutrally stable hip bellows joint. The hip bellows 140 as constrained with the internal restraint linkage assembly will permit a total fore and aft deflection of 75° and a side deflection of 70°. In addition, because of the provision of the relatively large hip bellows joint 36, which is attached to the thigh bellows joints 42 by bottom pan 52 and tubular metal portions 54, thigh movement is consequently far greater than would be permitted by the thigh bellows joints 42 unaided by the hip bellows joint 36, thus permitting greater bending capability for bending over, kneeling, and climbing.

In a typical hip bellows joint 36 having the parameters set forth below, the optimum mid-link length is determined to be 78%:

| | |
|---|---|
| Bellows outer diameter | 24 inches. |
| Bellows internal diameter | 20 inches. |
| Bellows length | 12 inches. |
| Nominal volume | 4050 inches $^3$. |
| Bellows material | Stainless steel, .006" material thickness. |
| K (spring constant) | 6.5 lbs./in. |
| Nominal deflection angle | 30°. |
| Working pressure differential | 5 lbs./in.$^2$. |

The arm joint

The arms have the greatest requirement for flexibility and mobility and, therefore, the entire upper portion of each arm assembly is fabricated from several identical bellows elements. It has been found that a series of seven bellows, constructed so as to be neutrally stable, affords a very satisfactory arm. These seven bellows are shown as being all externally constrained with the planes of deflection of adjacent bellows being rotated at a 75° offset from each other. The new result of this restraint linkage bending plane geometry is that the arms may be deflected through a nominal angle of 125° in any bending plane. Each individually pressurized bellows can be deflected plus or minus 16° in opposite directions with no net bending moment being required, i.e., no effort needing to be applied, and can be further deflected to the maximum limit of plus or minus 28° with only 10 pound-inches of bending effort required when internally pressurized to 5 p.s.i. With seven of the bellows stacked in series, the total moment required to deflect the complete arm assembly will still be only 10 pound-inches, since the bending moment of one bellows is transmitted directly to the base of the adjacent bellows element. Because of the 75° rotation, the 125° nominal angle results. In the following discussion with respect to FIGURES 7–11, the restraint links are shown on the outside of the respective bellows in order to describe easily the arm joint. If the restraint links were disposed inside of the respective bellows, the arm joint would function as well and, in addition, this configuration would afford greater protection against the space environment for the links by enclosing them.

Each arm section 26 comprises a plurality of bellows 170 (seven bellows 170 being shown in the illustrated embodiment) connected together, as by welding, by several couplings 172. At each end of the series of bellows are two terminal couplings 174, one of which is joined to a flange 176 for connection to body section 24 and the other of which is secured to a bridging metal portion 178 for connection to wrist joint 40. Adjacent couplings of the plurality of couplings including the intermediate couplings 172 and the terminal couplings 174 are joined to each other by pairs of restraint linkages 180. Each linkage 180 is identical to the linkage shown in FIG. 6 which was previously described in connection with the description of the thigh joint 42. Thus, each bellows 170 and the pair of restraint linkages 180 associated therewith cooperate so as to maintain the bellows 170 in a neutrally stable condition.

One linkage 180 of each pair is disposed 180° apart from the other linkage 180 of the same pair. Another important feature of the invention, however, rests in the relationship of one pair with an adjacent pair. In this respect, adjacent pairs of linkages 180 are offset at an angle less than 90° to provide maximum flexibility for the arm section 26. It has been determined that an angular offset of 75° will insure substantially maximum flexibility for an assembly comprising seven bellows. For arm assemblies made up of bellows other than seven in number, the angular offset between adjacent pairs of linkages 180 will take on some value other than 75° in order that the bending planes of the pairs of linkages 180 at the opposite ends of the arm assembly will be offset 90°, just as the pairs A–A' and G–G' of linkages 180 are shown in FIGURES 7 and 8. Referring to FIGURES 7 and 8, it is seen that each pair of linkages 180 has been indicated as A–A', B–B', C–C', D–D', E–E', F–F', and G–G'. In FIG. 7, each pair of linkages 180 has been labeled so that the linkage of each pair is shown to be 75° rotated or offset from the corresponding linkage of the adjacent pair, i.e., linkage B is 75° offset from linkage A, linkage C is 75° offset from linkage B, etc. Where both linkages of a pair can be seen in FIG. 7, each linkage has been so indicated. Where only one linkage can be seen, however, that linkage is appropriately indicated, i.e., B–B' indicates that linkage B can be seen and linkage B' cannot be seen because it is 180° opposite, while pair E'–E indicates that linkage E' can be seen while linkage E cannot. The reason for this rotation will become apparent upon inspection of FIG. 8 in which it is seen, looking in a counter-clockwise direction, that linkage B is 75° angularly offset from linkage A, linkage C is 75° angularly offset from linkage B, etc. It will be understood that the 180° offset linkages of each pair will have the same 75° angular offset between such linkages of adjacent pairs of linkages, and this relationship can be readily seen in FIGURE 8.

In order to better understand the advantages obtained from the 75° angular offset, reference is made to FIG. 9 in which the amount of arm deflection is plotted against the bending direction for a 90° skewed alternate deflection plane and for a 75° skewed alternate deflection plane. An alternate deflection plane is the same as an angular offset. From an inspection of the curves, it is readily apparent that the amount of arm deflection for a 75° skewed alternate deflection plane or angular offset approaches uniformity to a much greater extent than the curve representing the amount of arm deflection for the 90° skewed alternate deflection plane. This comparison means that in the case of an arm assembly having seven bellows, the 75° angular offset provides a more flexible arm than a 90° angular offset, since there are no significant limitations in arm deflection in certain directions.

The wrist joint

Wrist joint 40 is also depicted in FIG. 7. The wrist joint 40 comprises a bellows 190 provided with couplings 192 welded at each end thereof. One coupling 192 is shown as being formed integral with bridging portion 178 while the other coupling 192 is disposed on the opposite end of the wrist joint 40 and is adapted to receive a glove for securing the glove to the wrist joint 40. With reference to FIGS. 7 and 11, the linkages respectively associated with each of the couplings 192 at the opposite ends of the bellows 190 are generally identical except as to size—the linkage associated with the coupling 192 on the outer end of the wrist joint 40 being somewhat smaller in radial extent with respect to its coupling 192 as compared to the linkage associated with the coupling 192 which is integral with the bridging portion 178 for avoiding contact between these linkages when the bellows 190 of the wrist joint 40 is bent. Each of these linkages comprises a pair of diametrically opposite retainers 194 which are respectively provided with enlarged openings 196. A mount 198 is disposed between each retainer 194 and the coupling 192 corresponding thereto for supporting the diametrically opposite retainers 194 in radially outwardly spaced relation to the coupling 192 and the bellows 190. Each mount 198 is provided with a bore 200. A cap screw 202 extends through the retainer 194 and the mount 198 and is threadably secured into the coupling 192. A washer 204 is disposed between the retainer 194 and the head of the cap screw 202 to prevent the head of the cap screw 202 from entering the enlarged opening 196 in the retainer 194. The enlarged opening 196 is provided to permit adjustment of the retainer 194 relative to the cap screw 202. A pair of rings 206 are disposed about the bellows 190 and between the couplings 192. Each ring 206 is pivotally secured to the diametrically opposite retainers 194 mounted on a coupling 192. In this respect, the pivotal securement between each retainer 194 and the ring 206 corresponding thereto is effected by a bearing 208 and a screw 210 which extends through the bearing 208 and threadably engages the ring 206. Washers 212 are disposed on either side of the bearing 208. A pair of links 214, only one of which can be seen in FIGURE 7, are connected between the rings 206 by pivots 216. Each link 214 comprises a spacer screw 220 and a pair of retainers 218 which are journaled on the pivots 216 with the opposite ends of the spacer screw 220 being respectively connected to the retainers 218. The wrist joint assembly including the retainers 194, rings 206, and links 214 comprises a universal joint similar to that shown in FIG. 5. As earlier noted in describing the linkages respectively associated with the couplings 192 at the opposite ends of the bellows 190, the ring 206 disposed in association with the outer coupling 192 is of smaller diameter than the ring 206 disposed in association with the coupling which is integral with the bridging portion 178. The distance between the rings 206 exceeds 65% of the distance between couplings 192. Since the pairs of pivots 216 to which the respective links 214 are pivotally secured at their opposite ends are arranged to lie in the same planes as those about which the rings 206 may pivot, the wrist joint 40 comprises a universal neutrally stable joint.

In a typical wrist joint 40 with the parameters set forth below, the optimum mid-link length is determined to be 91%:

| | |
|---|---|
| Bellows outer diameter | 4.5 inches. |
| Bellows internal diameter | 3.5 inches. |
| Bellows length | 4 inches. |
| Nominal volume | 44.3 inches$^3$. |
| Bellows material | Stainless steel. |
| K (spring constant) | 5.25 lbs./in. |
| Nomina deflection angle | 40°. |
| Working pressure differential | 5 lbs./in.$^2$. |

The rotary joint

Figure 12:
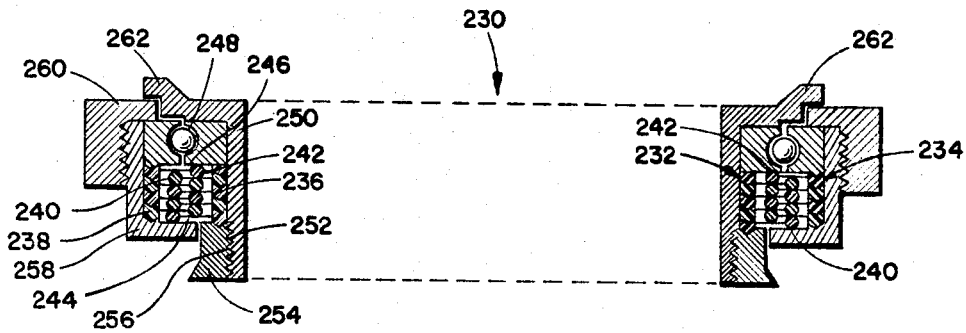
FIG. 12 is a longitudinal sectional view of a rotary joint comprising a component of the improved space suit.

Typically, a conventional full-pressure space suit obtains wrist and foot mobility without use of a ball-bearing wrist joint simply by requiring the wearer thereof to twist the appropriate portion of the space suit. Such a suit, when unpressurized, permits wrist rotation of about 135° which compares with a wrist rotation of over 200° for an unencumbered wrist. Upon pressurizing such a conventional space suit to 3.5 p.s.i., it is only with the greatest of effort that the wrist portions thereof can be rotated even 20° to 30°. The present improved space suit 20 therefore is provided with a rotary joint for each wrist portion and for each ankle portion thereof. In this connection, FIG. 12 shows a combination seal and thrust bearing rotary joint 230 which when serving as a rotary wrist joint may be located either on the glove side of the wrist bellows 190 outwardly with respect to the outer coupling 192, as shown, or between the wrist bellows joint 40 and the series of arm bellows joints 170 in place of the bridging portion 178. Rotary joint 230 comprises inner seal elements 232 and outer seal elements 234. Each of the inner seal elements 232 comprises a unitary seal element of a resilient elastomeric or plastic material, such as polytetrafluoroethylene known as "Teflon." The unitary seal element includes an inner ring 236 having a chevron-shaped transverse cross-section, an intermediate diaphragm 244, and an outer O-ring 240 having a circular transverse cross-section machined or molded of a single piece of suitable material. Similarly, each of the outer seal elements 234 comprises a unitary seal element of a suitable resilient elastomeric or plastic material, such as "Teflon," wherein the unitary seal element includes an outer ring 238 having a chevron-shaped transverse cross-section, an intermediate diaphragm 246, and an inner O-ring 242. The inner and outer seal elements 232 and 234 are arranged in alternating relationship so as to provide a stack of seal elements with the chevron-shaped rings 236, 238, the O-rings 240, 242, and the diaphragms 244, 246 positioned in a particular manner. In this respect, the inner chevron-shaped rings 236 of the inner seal elements 232 are stacked in juxtaposed relation to each other, as are the outer chevron-shaped rings 238 of the outer seal elements 234, while the O-rings 240 and the diaphragms 244 of the inner seal elements 232 alternate with the O-rings 242 and the diaphragms 246 of the outer seal elements 234. Upon compressing the stack of alternating inner and outer seal elements 232 and 234, the inner chevron-shaped ring portions 236 of the inner seal elements 232 and the outer chevron-shaped ring portions 238 of the outer seal elements 234 are respectively urged together in juxtaposed fluid-tight sealing relationship. Preloading of the alternating O-ring 240—diaphragm 244 portions of the inner seal elements 232 and O-ring 242—diaphragm 246 portions of the outer seal elements 234 also occurs, so as to cause the O-ring portions 240 of the inner seal elements 232 to engage the adjacent diaphragm portion or portions 246 of the outer seal elements 234 in relatively rotatable sealing relationship. Similarly, the O-ring portions 242 of the outer seal elements 234 are caused to engage the adjacent diaphragm portion or portions 244 of the inner seal elements 232 in relatively rotatable sealing relationship.

Upon proper adjustment of the seal assembly hereinbefore described, a multiple number of relatively rotatable surfaces form dynamic seals, while only the outermost seal elements will be directly exposed to environmental conditions, such as exist in space. In time, should an outermost seal element fail because of continued exposure to the space environment, the inner seal elements will continue to provide an effective fluid-tight seal.

While the inner and outer seal elements 232 and 234 preferably include chevron-shaped rings 236 and 238, respectively, as described, it will be understood that the static seals formed along the inner and outer peripheries of the seal assembly may be provided by inner and outer ring portions of the inner and outer seal elements 232 and 234 having other suitable cross-sectional shapes, such as a rectangular cross-section or a square cross-section, for example.

Although several sets of alternating seal elements 232 and 234 would be adequate as a seal assembly in most instances, an increased number of seal elements 232 and 234 may be arranged in stacked relationship to insure that a fluid-tight seal is maintained by the seal assembly under extremely severe conditions. Should a sufficient number of seal elements 232 and 234 be stacked together, the ball-type thrust bearing 248 may possibly be eliminated so as to permit the seal elements 232 and 234 to carry thrust themselves. Moreover, the axially directed thrust aids in properly seating the individual seal elements 232 and 234 to enhance the sealing effectiveness of the seal assembly.

In order to provide compression of the seal assembly, an inner annular member or sleeve 250 includes an externally threaded end portion 252. An annular packing gland or nut 254 having internal threads 256 is mounted on the sleeve 250 with its internal threads 256 engaging the externally threaded end portion 252 of the sleeve 250. The inner and outer alternating seal elements 232 and 234 are arranged in stacked relation so as to extend about the sleeve 250, one end of the seal assembly being disposed against the ball-type thrust bearing 248 and the opposite end being disposed adjacent the packing gland 254. A cup-shaped casing 258 is mounted about the outer periphery of the seal assembly and cooperates with the sleeve 250 to define a stuffing box for receiving the seal assembly. The casing 258 includes a radially inwardly directed flange integral with one end thereof which extends toward the packing gland 254 so as to overlie the end of the seal assembly remote from the thrust bearing 248. A threaded cap or thimble 260 is threadably secured about the casing 258 at the opposite end thereof and abuts the outer race of the thrust bearing 248. The sleeve 250 includes a radially outwardly extending projection 262 which partially overlaps the portion of the cap 260 in abutment with the thrust bearing 248 and also engages the inner race of the thrust bearing 248. It will be understood that the packing gland 254 may be advanced along the sleeve 250 by rotation thereof to engage the adjacent chevron-shaped ring portion 236 of the outwardly disposed inner seal element 232 and to compress the seal assembly comprising the stacked alternating inner and outer seal elements 232 and 234. The cap 260 may be secured to the wrist bellows joint 40, while the packing gland 254 may be secured to a glove which is adapted to be worn over a hand of the occupant of the improved space suit. The rotary joint may also be disposed adjacent each of the ankle bellows joints to provide for improved mobility of the feet of the space suit. It will be understood that the inner components of the rotary joint 230 comprising the sleeve 250, the inner race of the thrust bearing 248, the packing gland 254, and the inner seal elements 232 are relatively rotatable with respect to the outer components comprising the casing 258, the outer race of the thrust bearing 248, the cap 260, and the outer seal elements 234, and accordingly, the inner components can be swivelled within the outer components of the rotary joint 230 in effecting the desired turning movement of the wrist without appreciable physical effort.

While the foregoing is a description of the preferred embodiment, the following claims are intended to include those modifications and variations that are within the spirit and scope of my invention.

I claim:

1. A space suit comprising a body having rigid arm, leg, and head portions secured thereto, each of said leg portions including a single ankle bellows joint, a single knee bellows joint, and a pair of connected single thigh bellows joints, each of said arm portions including a wrist bellows joint and a plurality of interconnected single bellows joints, and said body including a universal bellows joint; said bellows joint including couplings respectively secured to opposite ends of said bellows, said couplings being provided with sets of pivots disposed 180° apart, and a mid-link extending between each set of pivots, each of said mid-links being pivotally secured at its opposite ends to the respective pivot of the set of pivots corresponding thereto and the length of each of said mid-links being in the order of 65% or greater than the distance between the opposite ends of the bellows corresponding thereto when the bellows assumes an undeflected straight position, the excess of length beyond the 65% being directly related to the spring constant of the bellows in accordance with the equation $$F_L = \frac{KR^2\phi^2}{10,300\Delta P \cdot V_1} + 1$$

where $F_L$ equals the ratio $V_2/V_1$;
$V_2$ equals the volume of the bellows when deflected through $\phi$ degrees;
$V_1$ equals the volume contained within the undeflected bellows;
$K$ equals the spring constant of the bellows;
$R$ equals the bellows radius;
$\phi$ equals the deflection angle; and,
$\Delta P$ equals the difference in pressure between the interior and exterior of the bellows;

wherein the mid-link length is equal to the abscissa intersect of the value $100(F_L)$ percent with the maximum deflection angle $\phi$ of FIG. 4.

2. A space suit as set forth in claim 1, wherein the excess length of each of said mid-links over and above 65% of the distance between the opposite ends of the bellows corresponding thereto when the bellows assumes an undeflected straight position; wherein the excess of the length of the mid-link above the 65% is an inverse function of the pressure differential between the interior and exterior of the bellows.

3. A space suit as set forth in claim 1, wherein said universal bellows joint comprises a bellows, couplings respectively secured to the opposite ends of said bellows, a pair of rings corresponding said said couplings and having diametricaly opposed pivotal connections to the respective coupling corresponding thereto, and a pair of mid-links extending between said rings, said mid-links being pivotally secured between each of said rings at points 90° offset from the pivotal connections between said rings and said couplings; wherein the distance between the corresponding pivotal connector of said mid-links to their respective couplings is greater than 65% of the distance between the opposite ends of said bellows when the bellows assumes an undeflected straight position and wherein the excess of the length of said mid-link beyond the 65% is directely related to the spring constant of the bellows.

4. A space suit as set forth in claim 1, wherein said plurality of interconnected single bellows joints included in each of said arm portions comprise a series of bellows, couplings respectively disposed between adjacent bellows and securing adjacent bellows together, and a pair of mid-links offset 180° from each other secured by pivots to adjacent couplings and extending therebetween across each of said bellows; each of said mid-links having a length between respective pivots greater than 65% of the distance between opposite ends of said bellows wherein the excess of the length of said mid-link beyond the 65% is directly related to the spring constant of the bellows.

5. A space suit as set forth in claim 4, wherein each of said pairs of mid-links is staggered from the pair of mid-links adjacent thereto by an offset angle to provide maximum universal flexibility of said plurality of interconnected single bellows joints.

6. A space suit as set forth in claim 5, wherein the offset angle is less than 90°.

7. A space suit as set forth in claim 1, wherein each of said wrist bellows joints comprises a bellows, couplings respectively secured to the opposite ends of said bellows, a pair of rings corresponding to said couplings and having diametrically opposed pivotal connections to the respective coupling corresponding thereto, and a pair of mid-links extending between said pair of rings, said mid-links being pivotally secured between each of said rings at points 90° offset from the pivotal connections between said rings and said couplings; wherein the distance between the corresponding pivotal connector of said mid-links to their respective couplings is greater than 65% of the distance between the opposite ends of said bellows when the bellows assumes an undeflected straight position and wherein the excess of the length of said mid-link beyond the 65% is directly related to the spring constant of the bellows.

8. In a space suit, a body having rigid upper and lower tubular portions and a hip bellows joint secured therebetween, said hip bellows joint comprising a bellows, and a universal linkage means including mid-links having lengths less than the length of said bellows when said bellows assumes an undeflected straight position, said bellows and said linkage means being interrelated such that said bellows is caused to be neutrally stable, wherein said linkage means comprises a coupling secured to each end of said bellows and respectively secured to said upper and lower tubular portions, each of said couplings being provided with diametrically opposed pivots, a pair of rings corresponding to said couplings and being journaled on said pivots of the respective coupling corresponding thereto, each of said rings having a pair of further pivots arranged normally to said pivots connecting said ring to its respective coupling, and said mid-links being secured between corresponding ones of said further pivots to extend between said rings; wherein the distance between the corresponding pivotal connector of said mid-links to their respective couplings is greater than 65% of the distance between the opposite ends of said bellows when the bellows assumes an undeflected straight position and wherein the excess of the length of said mid-link beyond the 65% is directly related to the spring constant of the bellows in accordance with the equation $$F_L = \frac{KR^2\phi^2}{10,300\Delta P \cdot V_1} + 1$$

where
$F_L$ equals the ratio $V_2/V_1$;
$V_2$ equals the volume of the bellows when deflected through $\phi$ degrees;
$V_1$ equals the volume contained within the undeflected bellows;
K equals the spring constant of the bellows;
R equals the bellows radius;
$\phi$ equals the deflection angle; and,
$\Delta P$ equals the difference in pressure between the interior and exterior of the bellows;
wherein the mid-link length is equal to the abscissa intersect of the value $100(F_L)$ percent with the maximum deflection angle $\phi$ of FIG. 4.

9. In a space suit, a leg portion comprising an ankle joint secured between a foot and a first tubular portion, a knee joint secured between said first tubular portion and a second tubular portion, and a thigh joint secured to said second tubular portion and adapted to be secured to a body, each of said joints including a bellows and linkage means having mid-links extending across said bellows, said mid-links having lengths less than the length of said bellows when said bellows assumes an undeflected straight position, said bellows and said linkage means being interrelated in that the length of said mid-links is greater than 65% of the undeflected lengths of their respective bellows, the excess of the length of said mid-links over and above 65% being directly related to the spring constant of the bellows, the space suit further including rotary joint means interposed between said ankle joint and said foot, said rotary joint means comprising a plurality of concentric relatively rotatable seal elements arranged in sealing relationship with each other, wherein said plurality of concentric relatively rotatable seal elements comprise inner and outer seal elements arranged in alternating relatively rotatable relationship, said inner and outer seal elements respectively including inner ring portions stacked in static sealing relationship and outer ring portions stacked in static sealing relationship, a diaphragm portion secured to each of said inner and outer ring portions, and said diaphragm portions being interleaved to provide relative rotation between adjacent diaphragm portions.

10. In a space suit as set forth in claim 9, wherein said inner ring portions and said outer ring portions have chevron-shaped cross-sections.

11. In a space suit as set forth in claim 9, further including thrust bearing means positioned in abutment with said inner and said outer seal elements.

12. In a space suit, an arm portion including a series of alternating interconnected couplings and bellows, plural linkage means journaled on said couplings and having mutual relationship wherein the plural linkage means includes mid-links which have a length in excess of 65% of the undeflected lengths of their respective bellows, the length of said mid-links being related to the characteristics of the bellows in accordance with the equation $$F_L = \frac{KR^2\phi^2}{10,300\Delta P \cdot V_1} + 1$$

where
$F_L$ equals the ratio $V_2/V_1$;
$V_2$ equals the volume of the bellows when deflected through $\phi$ degrees;
$V_1$ equals the volume contained within the undeflected bellows;
K equals the spring constant of the bellows;
R equals the bellows radius;
$\phi$ equals the deflection angle, and;
$\Delta P$ equals the difference in pressure between the interior and exterior of the bellows;
wherein the mid-link length is equal to the abscissa intersect of the value $100(F_L)$ percent with the maximum deflection angle $\phi$ of FIG. 4; to provide maximum flexibility of said series, said linkage means being so arranged with respect to each of said bellows to cause each of said bellows to be neutrally stable.

13. In a space suit as set forth in claim 12, wherein each of said linkage means is staggered with respect to an adjacent linkage means.

14. In a space suit as set forth in claim 13, wherein the staggered relationship between adjacent linkage means is determined by an offset angle of less than 90°.

15. In a space suit as set forth in claim 12, wherein each of said linkage means comprises a first pair of pivots disposed 180° apart on a first of said couplings connected to one end of a respective bellows, a second pair of pivots disposed 180° apart on a second of said couplings connected to the other end of the respective bellows, corresponding pivots of said first and second pairs of pivots being disposed in opposing relationship and extending toward each other, and a mid-link extending between and secured to said corresponding pivots of said first and second pairs of pivots.

16. In a space suit as set forth in claim 12, where one end of said arm portion terminates in a rotary wrist joint, said rotary wrist joint comprising a plurality of concentric relatively rotatable seal elements arranged in sealing relationship with each other, said inner and outer seal elements respectively including inner ring portions stacked in static sealing relationship and outer ring portions stacked in static sealing relationship, a diaphragm portion secured to each of said inner and outer ring portions, and said diaphragm portions being interleaved to provide relative rotation between adjacent diaphragm portions.

17. In a space suit as set forth in claim 16, wherein said inner ring portions and said outer ring portions have chevron-shaped cross sections.

18. In a space suit as set forth in claim 12, wherein said arm portion has a wrist bellows joint at one end of said series of alternating interconnected couplings and bellows, said wrist bellows joint including a bellows and universal linkage means operably associated with said bellows so as to cause said bellows to be neutrally stable.

19. In a space suit, a wrist joint comprising a bellows and universal linkage means including mid-links extending across said bellows, said mid-links having lengths less than that of said bellows and being pivotally connected at their opposite ends between the ends of said bellows the length of said mid-links related to the bellows characteristics in accordance with the equation $$F_L = \frac{KR^2\phi^2}{10,300\Delta P \cdot V_1} + 1$$

where $F_L$ equals the ratio of $V_2/V_1$;
$V_2$ equals the volume of the bellows when deflected through $\phi$ degrees;
$V_1$ equals the volume contained within the undeflected bellows;
$K$ equals the spring constant of the bellows;
$R$ equals the bellows radius;
$\phi$ equals the deflection angle, and;
$\Delta P$ equals the difference in pressure between the interior and exterior of the bellows;

wherein the mid-link length is equal to the abscissa intersect of the value 100($F_L$) percent with the maximum deflection angle $\phi$ of FIG. 4; such that said bellows is caused to be neutrally stable.

20. In a space suit as set forth in claim 19, wherein said universal linkage means further comprises couplings respectively secured to the opposite ends of said bellows, said couplings being respectively provided with pairs of diametrictally opposed pivots extending toward each other, a pair of rings corresponding to said couplings and journaled on the pair of pivots of the coupling corresponding thereto, said rings being respectively provided with further pairs of diametrically opposed pivots disposed at points 90° offset from said pairs of pivots provided on said couplings and in the same respective planes therewith, and said mid-links being journaled between corresponding pivots of said further pairs of pivots.

21. A flexible joint comprising a cylindrical bellows, annular coupling members respectively secured to the opposite ends of said bellows, said couplings being respectively provided with pairs of diametrically opposed pivots extending toward each other, a pair of rings corresponding to said couplings and journaled on the pair of pivots of the coupling corresponding thereto, said rings being respectively provided with further pairs of diametrically opposed pivots disposed at points 90° offset from said pairs of pivots provided on said couplings and in the same respective planes therewith, a link extending between each set of corresponding pivots of said further pairs of pivots and having its opposite ends journaled thereto, and each of said links having a length greater than 65% of the distance between the opposite ends of said bellows when the bellows assumes an undeflected straight position to cause said bellows to be neutrally stable.

22. A rotary joint comprising a plurality of concentric inner and outer annular seal elements arranged in alternating relatively rotatable sealing relationship, an inner cylindrical sleeve, an outer casing having an internal cylindrical surface, said sleeve and said casing being disposed in radially spaced relatively rotatable relationship, said inner seal elements including inner ring portions stacked in static sealing relationship about said sleeve, said outer seal elements including outer ring portions stacked in static sealing relationship with the internal cylindrical surface of said casing, a diaphragm portion terminating in an enlarged end being secured to each of said inner and outer ring portions, said diaphragm portions being interleaved to provide relative rotation between adjacent diaphragm portions, and means to compress said inner and outer seal elements for providing sealing engagement between each enlarged end of a diaphragm portion and the relatively rotatable diaphragm portion adjacent thereto.

References Cited

UNITED STATES PATENTS

| | | | |
|---|---|---|---|
| 237,141 | 2/1881 | Tasker | 2—2.1 |
| 2,335,475 | 11/1943 | Beall | 2—2.1 |
| 2,707,117 | 4/1955 | Fentress et al. | 2—2.1 X |
| 2,865,403 | 12/1958 | Le Vantine | 285—226 X |
| 2,886,066 | 5/1959 | Hansen | 2—2.1 X |
| 3,030,626 | 4/1962 | Shepard | 2—2.1 |
| 3,242,499 | 3/1966 | Fonda-Bonardi | 2—2.1 |

FOREIGN PATENTS

| | | |
|---|---|---|
| 250,188 | 9/1926 | Italy. |

JORDAN FRANKLIN, *Primary Examiner.*

J. BOLER, *Examiner.*